United States Patent
Kollar et al.

(10) Patent No.: US 8,442,755 B2
(45) Date of Patent: May 14, 2013

(54) SYSTEMS AND METHODS FOR PREVENTING MOTOR VEHICLE SIDE DOORS FROM COMING INTO CONTACT WITH OBSTACLES

(75) Inventors: Craig A. Kollar, Sterling Heights, MI (US); Thomas A. Wilson, Rochester Hills, MI (US); Nigel G. Jones, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1008 days.

(21) Appl. No.: 12/239,981

(22) Filed: Sep. 29, 2008

(65) Prior Publication Data

US 2010/0082206 A1 Apr. 1, 2010

(51) Int. Cl.
*G06F 17/10* (2006.01)

(52) U.S. Cl.
USPC ........... 701/301; 340/435; 340/436; 296/155; 296/187.03; 318/466; 180/167

(58) Field of Classification Search ............ 701/36, 701/41, 48–49, 53, 46, 301; 318/264; 49/26, 49/467; 296/146.4, 146.1, 187.03, 155; 348/143, 348/148, 153; 250/216; 280/735; 362/487, 362/494; 345/156; 340/13.24, 5.72, 435–436
See application file for complete search history.

(56) References Cited

U.S. PATENT DOCUMENTS

| | | | | |
|---|---|---|---|---|
| 5,307,271 A * | 4/1994 | Everett et al. | | 701/24 |
| 6,234,520 B1 * | 5/2001 | Breed et al. | | 280/735 |
| 7,147,246 B2 * | 12/2006 | Breed et al. | | 280/735 |
| 7,164,117 B2 * | 1/2007 | Breed et al. | | 250/221 |
| 7,193,509 B2 * | 3/2007 | Bartels et al. | | 340/436 |
| 7,232,001 B2 * | 6/2007 | Hakki et al. | | 180/271 |

(Continued)

FOREIGN PATENT DOCUMENTS

| | | |
|---|---|---|
| DE | 101175516 A1 | 10/2002 |
| WO | 2005008007 A1 | 1/2005 |
| WO | 2005044639 A1 | 5/2005 |

OTHER PUBLICATIONS

Vision-based side vehicle detection from a moving vehicle; Wen-Chung Chang; Kuo-Jung Hsu; System Science and Engineering (ICSSE), 2010 International Conference on; Digital Object Identifier: 10.1109/ICSSE.2010.5551779 Publication Year: 2010 , pp. 553-558.*

(Continued)

*Primary Examiner* — Cuong H Nguyen
(74) *Attorney, Agent, or Firm* — Ingrassia Fisher & Lorenz, P.C.

(57) ABSTRACT

Systems and methods for preventing a motor vehicle side door from coming into contact with an obstacle are provided. One system includes an outside rear view mirror, a camera coupled to the outside rear view mirror, and a controller coupled to the camera. The camera is configured to detect the obstacle and determine the distance between the side door and the obstacle, and the controller is configured to disable the side door if the obstacle is within a threshold distance of the side door. Another system replaces the camera with an ultrasonic sensor to detect the obstacle and determine the distance between the side door and the obstacle. A method includes determining the distance between a plurality of motor vehicle side doors and the obstacle, and automatically disabling each motor vehicle side door that is within a threshold distance of the obstacle.

20 Claims, 8 Drawing Sheets

U.S. PATENT DOCUMENTS

| | | | | |
|---|---|---|---|---|
| 7,251,789 B2* | 7/2007 | Obradovich | | 715/835 |
| 7,438,346 B1* | 10/2008 | Breed | | 296/146.4 |
| 7,663,502 B2* | 2/2010 | Breed | | 340/12.25 |
| 7,843,153 B2* | 11/2010 | Held et al. | | 318/264 |
| 7,882,921 B2* | 2/2011 | Hakki et al. | | 180/271 |
| 2004/0055110 A1* | 3/2004 | Breed et al. | | 16/82 |
| 2005/0046584 A1* | 3/2005 | Breed | | 340/825.72 |
| 2006/0043712 A1* | 3/2006 | Hakki et al. | | 280/735 |
| 2006/0178787 A1* | 8/2006 | McCall | | 701/1 |
| 2006/0208169 A1* | 9/2006 | Breed et al. | | 250/221 |
| 2006/0222207 A1* | 10/2006 | Balzer et al. | | 382/104 |
| 2008/0119994 A1* | 5/2008 | Kameyama | | 701/48 |
| 2008/0129684 A1* | 6/2008 | Adams et al. | | 345/156 |
| 2008/0296926 A1* | 12/2008 | Hanzel et al. | | 296/146.1 |
| 2008/0309060 A1* | 12/2008 | Hakki et al. | | 280/770 |
| 2009/0000196 A1* | 1/2009 | Kollar et al. | | 49/28 |
| 2009/0259372 A1* | 10/2009 | Hijikata et al. | | 701/49 |
| 2010/0082206 A1* | 4/2010 | Kollar et al. | | 701/49 |

OTHER PUBLICATIONS

An obstacle detection method by fusion of radar and motion stereo; Kato, T.; Ninomiya, Y.; Masaki, I.; Intelligent Transportation Systems, IEEE Transactions on; vol. 3 , Issue: 3; Digital Object Identifier: 10.1109/TITS.2002.802932; Publication Year: 2002 , pp. 182-188.*

Towards a closer fusion of active and passive safety: Optical flow-based detection of vehicle side collisions; Michalke, T.P.; Stein, F.; Franke, U.; Intelligent Vehicles Symposium (IV), 2011 IEEE; Digital Object Identifier: 10.1109/IVS.2011.5940446 Publication Year: 2011 , pp. 181-188.*

Obstacle avoidance strategy based on adaptive potential fields generated by an electronic stick ; Lopes, E.P.; Aude, E.P.L.; Silveira, J.T.C.; Serdeira, H.; Intelligent Robots and Systems, 2005. (IROS 2005). 2005 IEEE/RSJ International Conference on Digital Object Identifier: 10.1109/IROS.2005.1544996; Publication Year: 2005 , pp. 2626-2631.*

An obstacle avoidance system for an electric wheelchair; Brown, M.; Bradley, D.; New Developments in Electric Vehicles for Disabled Persons, IEE Colloquium on; Digital Object Identifier: 10.1049/ic:19950376; Publication Year: 1995 , pp. 4/1-4/4.*

Combined Capacitive and Ultrasonic Distance Measurement for Automotive Applications; Schlegl, T.; Bretterklieber, T.; Neumayer, M.; Zangl, H.; Sensors Journal, IEEE; Vol. 11 , Issue: 11; Digital Object Identifier: 10.1109/JSEN.2011.2155056 Publication Year: 2011 , pp. 2636-2642.*

Reactive navigation in dynamic environment using a multisensor predictor; Kai-Tai Song; Chang, C.C. Systems, Man, and Cybernetics, Part B: Cybernetics, IEEE Transactions on; vol. 29 , Issue: 6; Digital Object Identifier: 10.1109/3477.809039 Publication Year: 1999 , pp. 870-880.*

A novel sensor fusion concept for distance measurement in automotive applications; Schlegl, T.; Bretterklieber, T.; Neumayer, M.; Zangl, H.; Sensors, 2010 IEEE; Digital Object Identifier: 10.1109/ICSENS.2010.5690781; Publication Year: 2010 , pp. 775-778.*

An Interior Compartment Protection System Based on Motion Detection Using CMOS Imagers, S. B. Park et al., 1998 IEEE Int'l Conf. on Intelligent Vehicles, pp. 297-301.*

Omnidirectional Vision Sensor for Intelligent Vehicles, T. Ito et al., 1998 IEEE Int'l Conf. on Intelligent Vehicles, pp. 365-270.*

Robust image processing for an omnidirectional camera-based smart car door; Scharfenberger, C.; Chakraborty, S.; Farber, G. Embedded Systems for Real-Time Multimedia, 2009. ESTIMedia 2009. IEEE/ACM/IFIP 7th Workshop on Digital Object Identifier: 10.1109/ESTMED.2009.5336817; Publication Year: 2009 , pp. 106-115.*

Towards a closer fusion of active and passive safety: Optical flow-based detection of vehicle side collisions; Michalke, T.P.; Stein, F.; Franke, U.; Intelligent Vehicles Symposium (IV), 2011 IEEE; Digital Object Indentifier: 10.1109/IVS.2011.5940446 Publication Year: 2011 , pp. 181-188.*

Anti-trap protection for an intelligent smart car door system; Scharfenberger, C.; Chakraborty, S.; Zelek, J.; Clausi, D. Intelligent Transportation Systems (ITSC), 2012 15th International IEEE Conference on; Digital Object Identifier: 10.1109/ITSC.2012.6338635; Publication Year: 2012 , pp. 1734-1740.*

German Patent Office, German Office Action dated Jun. 20, 2012 for German Application No. 10 2009 042 927.1.

* cited by examiner

SYSTEMS AND METHODS FOR PREVENTING MOTOR VEHICLE SIDE DOORS FROM COMING INTO CONTACT WITH OBSTACLES

TECHNICAL FIELD

The present invention generally relates to motor vehicles, and more particularly relates to systems and methods for preventing motor vehicle side doors from coming into contact with obstacles.

BACKGROUND OF THE INVENTION

Many motor vehicles have motorized systems for opening one or more of the vehicle's side doors. These motorized systems may include features that are intended to detect obstacles in the opening path of the side doors while the side doors are being opened. However, these systems detect the obstacle by actually coming into physical contact with the obstacle. For example, a side door detects that an obstacle (e.g., another automobile, a person, etc.) is within its opening path when the side door contacts the obstacle.

Accordingly, it is desirable to provide systems and methods for preventing a motor vehicle side door from coming into contact with an obstacle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Systems are provided for preventing a motor vehicle side door from coming into contact with an obstacle. One system comprises an outside rear view mirror configured to be coupled to the motor vehicle side door, a camera coupled to the outside rear view mirror, and a controller coupled to the camera. The camera is configured to detect the obstacle and determine the distance between the motor vehicle side door and the obstacle, and the controller is configured to disable the motor vehicle side door if the obstacle is within a threshold distance of the motor vehicle side door.

Another system comprises an outside rear view mirror configured to be coupled to a motor vehicle side door, an ultrasonic sensor coupled to the outside rear view mirror, and a controller coupled to the ultrasonic sensor. The ultrasonic sensor is configured to detect the obstacle and determine the distance between the motor vehicle side door and the obstacle, and the controller is configured to disable the motor vehicle side door if the obstacle is within a threshold distance of the motor vehicle side door.

Methods are provided for preventing a plurality of motor vehicle side doors from contacting an obstacle. One method comprises the steps of determining the distance between the plurality of motor vehicle side doors and the obstacle, and automatically disabling each motor vehicle side door that is within a threshold distance of the obstacle.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
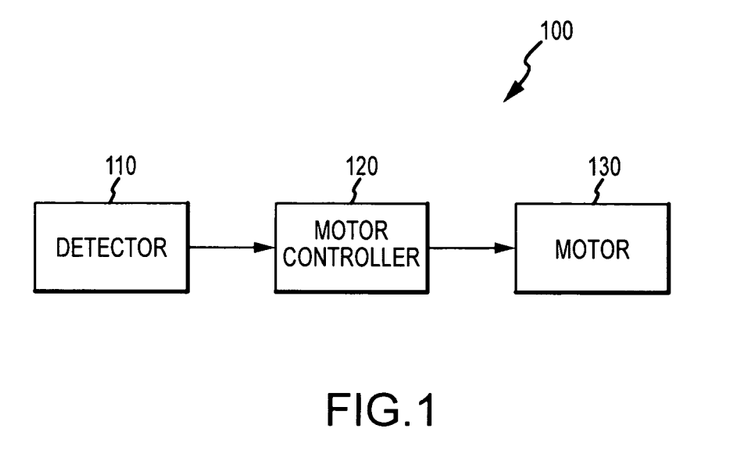
FIG. 1 is a block diagram of an exemplary embodiment of a system for preventing a motor vehicle side door from coming into contact with an obstacle.

FIG. 1 is a schematic diagram of an exemplary embodiment of a system 100 for preventing motor vehicle side doors from coming into contact with an obstacle (e.g., a pedestrian, another motor vehicle, a tree, a pole, a building, etc.). System 100 comprises a detector 110, a motor controller 120, and a motor 130 configured to open and/or close the motor vehicle door.

Detector 110 is coupled to motor controller 120, and is configured to monitor the environment surrounding detector 110 to detect the presence of an obstacle. Furthermore, detector 110 is configured to determine the distance the obstacle is away from one or more reference points (e.g., a motor vehicle door, a projected opening/closing path of the motor vehicle side door(s), etc.) and determine if the obstacle is at and/or within a threshold distance of one or more reference points (e.g., within the threshold distance of the side door(s) or the opening/closing path of one or more side doors).

To determine if an obstacle is present, and if present, the distance the obstacle is away from the reference point, detector 110 comprises components for visually and/or non-visually monitoring the opening/closing path of one or more side doors of the motor vehicle and detecting the presence of the obstacle within the opening/closing path. In other words, detector 110 determines the distance the obstacle is away from a motor vehicle side door to determine if the motor vehicle can be opened without contacting the obstacle. When detector 110 visually and/or non-visually detects that an obstacle is present and is within the opening/closing path, detector 110 is configured to transmit a signal to motor controller 120 indicating such.

Motor controller 120 is configured, upon receiving the signal transmitted from detector 110, to command motor 130 to disable each side door that has an obstacle within a threshold distance of its respective opening/closing path. In one embodiment, motor 130 disables a side door by stopping the side door when the side door is in motion. In another embodiment, motor 130 disables the side door by preventing the side door from opening or closing when the side door is at rest. In yet another embodiment, motor 130 disables the side door by reversing the direction of the side door. Specifically, if motor 130 is in the process of opening the side door, motor 130 disables the side door by closing the side door. Similarly, if motor 130 is in the process of closing the side door, motor 130 disables the side door by opening the side door.

Figure 2:
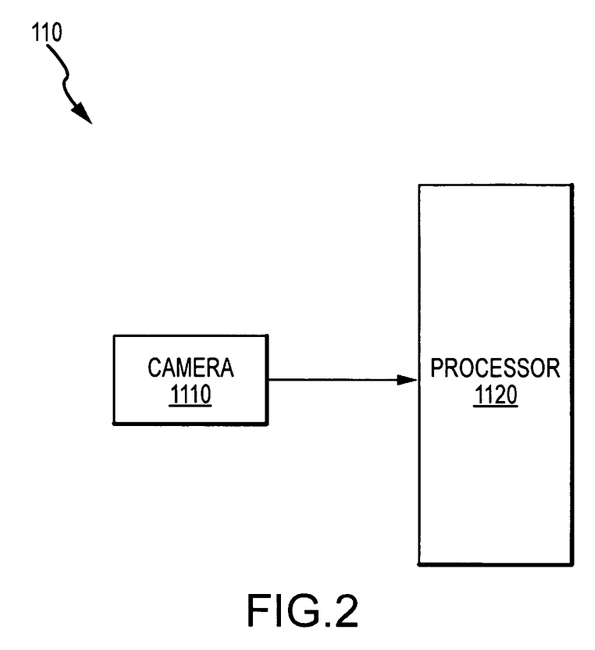
FIG. 2 is a block diagram of one embodiment of a detector included within the system of FIG. 1.

FIG. 2 is a block diagram of embodiment of detector 110 (see FIG. 1). At least in the embodiment illustrated in FIG. 2, detector 110 comprises a camera 1110 in communication with a processor 1120. Camera 1110 may be any device, hardware, software, imaging device, and/or optical device capable of visually monitoring and detecting the presence of an obstacle. Camera 1110 is also configured to determine the distance the obstacle is away from camera 1110 and if the obstacle is within a threshold distance of one or more motor vehicle side doors or the opening/closing path of the side door(s). Specifically, camera 1110 is pre-programmed to know the vector (i.e., the distance and direction) in which one or more of the side doors of the motor vehicle opens/closes and is capable of monitoring the environment surrounding the door(s) to determine if an obstacle is within the threshold distance using three-dimensional (3D) imaging and/or other visual distance-determining techniques.

In accordance with one exemplary embodiment, camera 1110 is a 3D time-of-flight imager. Here, when camera 1110 detects an obstacle within the threshold distance of the side door or the opening/closing path, camera 1110 is configured to transmit a signal to processor 1120 indicating such.

Processor 1120 is configured to receive the signals from camera 1110 indicating that an obstacle is present in the environment, the distance the obstacle is away from the side door, and/or if the obstacle is at and/or within the threshold distance of the opening/closing path of the side door. Processor 1120 is also configured to process the signals from camera 1110 and selectively transmit a signal to motor controller 120 (see FIG. 1) when an obstacle is at and/or within the threshold distance of the side door or side door opening/closing path so that motor controller 120 can disable the motor vehicle side door before the side door comes in contact with the obstacle.

In another embodiment (see FIG. 3), detector 110 of FIG. 1 comprises camera 1110 and processor 1120 similar to the embodiment discussed above with reference to FIG. 2. In addition, the embodiment illustrated in FIG. 3 comprises a sensor 1130 in communication with processor 1120.

Figure 3:
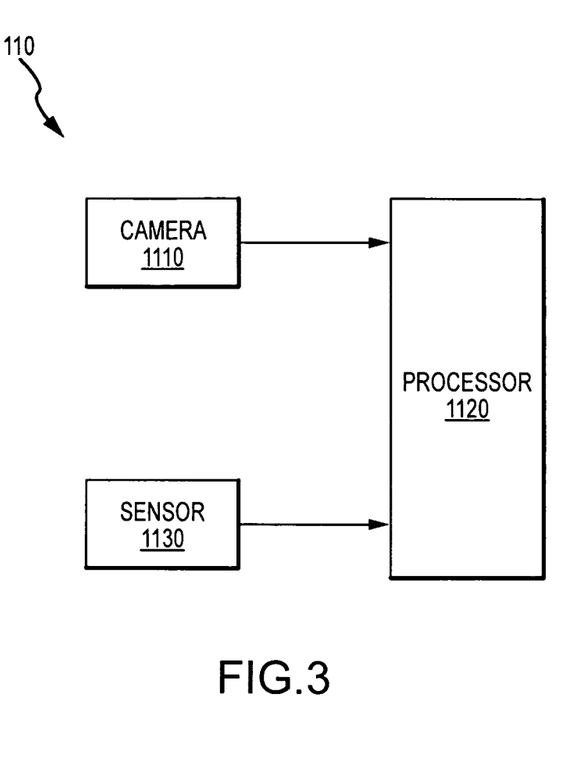
FIG. 3 is a block diagram of another embodiment of a detector included within the system of FIG. 1.

Sensor 1130 may be any device, hardware, and/or software capable of visually or non-visually (e.g., electrically, magnetically, optically, etc.) monitoring and detecting the presence of an obstacle. Furthermore, sensor 1130 is also configured to determine the distance the obstacle is away from sensor 1130 and if the obstacle is within a threshold distance of the motor vehicle side door or the opening/closing path of the side door. Sensor 1130 is configured to determine how far an obstacle is away from the side door or opening/closing path using capacitive sensing and/or other electrical distance-determining techniques.

In one exemplary embodiment, sensor 1130 is a capacitive or near-field sensor configured to form a capacitive element (e.g., a capacitor) when a conductive obstacle is at and/or within the threshold distance of sensor 1130. During operation, when sensor 1130 detects an obstacle within the threshold distance of the side door of the opening/closing path, sensor 1130 is configured to transmit a signal to processor 1120 indicating such.

In this embodiment, processor 1120 is configured to receive the signals from camera 1110 and/or sensor 1130 indicating that an obstacle is present in the environment, the distance the obstacle is away from the side door, and/or if the obstacle is at and/or within the threshold distance of the opening/closing path. Processor 1120 is also configured to process the signals from camera 1110 and/or sensor 1130, and selectively transmit a signal to motor controller 120 (see FIG. 1) when an obstacle is at and/or within the threshold distance of the side door or opening/closing path so that motor controller 120 can disable the motor vehicle side door before the side door comes into contact with the obstacle.

Figure 4:
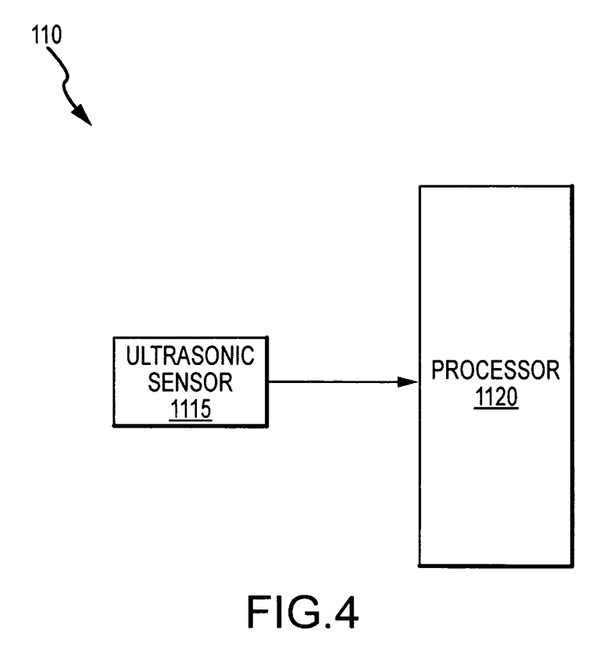
FIG. 4 is a block diagram of still another embodiment of a detector included within the system of FIG. 1.

FIG. 4 is a block diagram of another exemplary embodiment of detector 110 (see FIG. 1). In the embodiment illustrated in FIG. 4, detector 110 comprises an ultrasonic sensor 1115 in communication with a processor 1120.

Ultrasonic sensor 1115 may be any hardware, software, and/or device capable of sonically monitoring and detecting the presence of an obstacle. Ultrasonic sensor 1115 is also configured to determine the distance the obstacle is away from ultrasonic sensor 1115 and if the obstacle is within a threshold distance of one or more motor vehicle side doors or the opening/closing path of the side door(s). Specifically, ultrasonic sensor 1115 is pre-programmed to know the vector (i.e., the distance and direction) in which one or more of the side doors of the vehicle opens/closes and is capable of monitoring the environment surrounding the door(s) to determine if an obstacle is within the threshold distance using sound waves, radio waves, and/or other similar distance-determining techniques.

In accordance with one exemplary embodiment, ultrasonic sensor 1115 is a transducer that generates and transmits sound waves. When ultrasonic sensor 1115 detects an obstacle within the threshold distance of the side door or opening/closing path, ultrasonic sensor 1115 is configured to transmit a signal to processor 1120 indicating such.

Processor 1120 is configured to receive the signals from ultrasonic sensor 1115 indicating that an obstacle is present in the environment, the distance the obstacle is away from the reference point, and/or if the obstacle is at and/or within the threshold distance of the reference point. Processor 1120 is also configured to process the signals from ultrasonic sensor 1115 and selectively transmit a signal to motor controller 120 (see FIG. 1) when an obstacle is at and/or within the threshold distance of the reference point so that motor controller 120 can disable a motor vehicle side door that may come into contact with the obstacle.

In another embodiment (see FIG. 5), detector 110 of FIG. 1 comprises ultrasonic sensor 1115 and processor 1120 similar to the embodiment discussed above with reference to FIG. 4. In addition, the embodiment illustrated in FIG. 5 comprises a sensor 1130 in communication with processor 1120.

Figure 5:
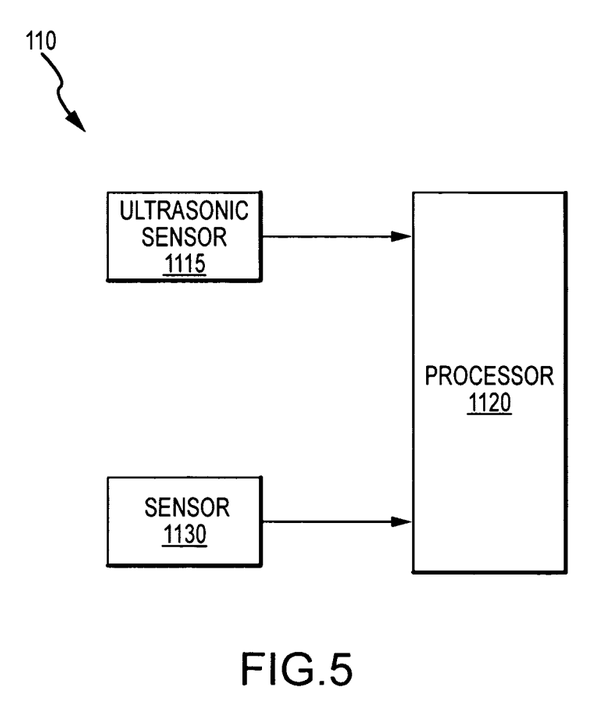
FIG. 5 is a block diagram of yet another embodiment of a detector included within the system of FIG. 1.

Sensor 1130 may be any device, hardware, and/or software capable of non-visually (e.g., electrically, magnetically, optically, etc.) monitoring and detecting the presence of an obstacle. Furthermore, sensor 1130 is also configured to determine the distance the obstacle is away from sensor 1130 and if the obstacle is within a threshold distance of a side door or an opening/closing path of the side door. Sensor 1130 is configured to determine how far an obstacle is away from the reference point using capacitive sensing and/or other electrical distance-determining techniques.

In one exemplary embodiment, sensor 1130 is a capacitive or near-field sensor configured to form a capacitive element (e.g., a capacitor) when a conductive obstacle is at and/or within a threshold distance of sensor 1130. When sensor 1130 detects an obstacle, sensor 1130 is configured to transmit a signal to processor 1120 indicating such.

In this embodiment, processor 1120 is configured to receive the signals from ultrasonic sensor 1115 and sensor 1130 indicating that an obstacle is present in the environment, the distance the obstacle is away from the side door, and/or if the obstacle is at and/or within the threshold distance of the side door or the opening/closing path of the side door. Processor 1120 is also configured to process the signals from ultrasonic sensor 1115 and/or sensor 1130, and selectively transmit a signal to motor controller 120 (see FIG. 1) when an obstacle is at and/or within the threshold distance of the side door or opening/closing path so that motor controller 120 can disable the motor vehicle side door before the motor vehicle side door comes into contact with the obstacle.

Figure 6:
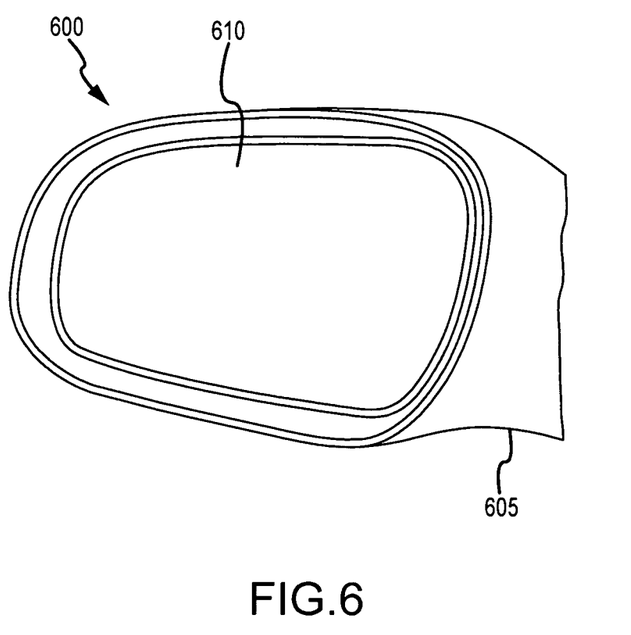
FIG. 6 is a diagram illustrating one embodiment of an outside rear view mirror comprising a camera or an ultrasonic sensor included as a portion of the detectors in FIGS. 2-5.

In accordance with various embodiments of detector 110, camera 1110 or ultrasonic sensor 1115 is located on a side portion of a motor vehicle. For example, camera 1110 or ultrasonic sensor 1115 may be located on or proximate to an outside rear view mirror (OSRVM), air flow vents, or any other applied trim parts on the side of the motor vehicle. In one embodiment (see FIG. 6), camera 1110 or ultrasonic sensor 1115 is coupled to a bottom portion 605 of an OSRVM 600. In another embodiment, camera 1110 or ultrasonic sensor 1115 is housed within OSRVM 600 behind a glass or mirror portion 610 of OSRVM 600. Accordingly, various embodiments of a motor vehicle may include OSRVM 600 on a driver side and/or on a passenger side of the motor vehicle.

Figure 7A:
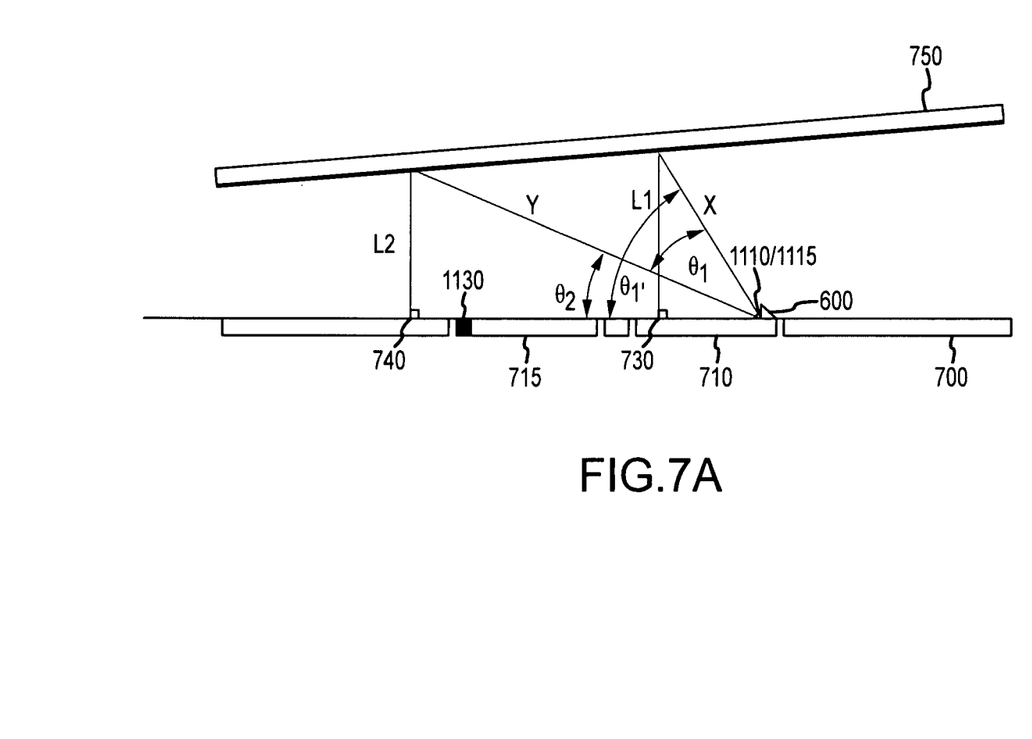
FIGS. 7A and 7B are schematic diagrams of a top view of a motor vehicle comprising the system of FIG. 1 and the OSRVM of FIG. 6, and represent the operations of various embodiments of the system of FIG. 1.
Figure 7B:
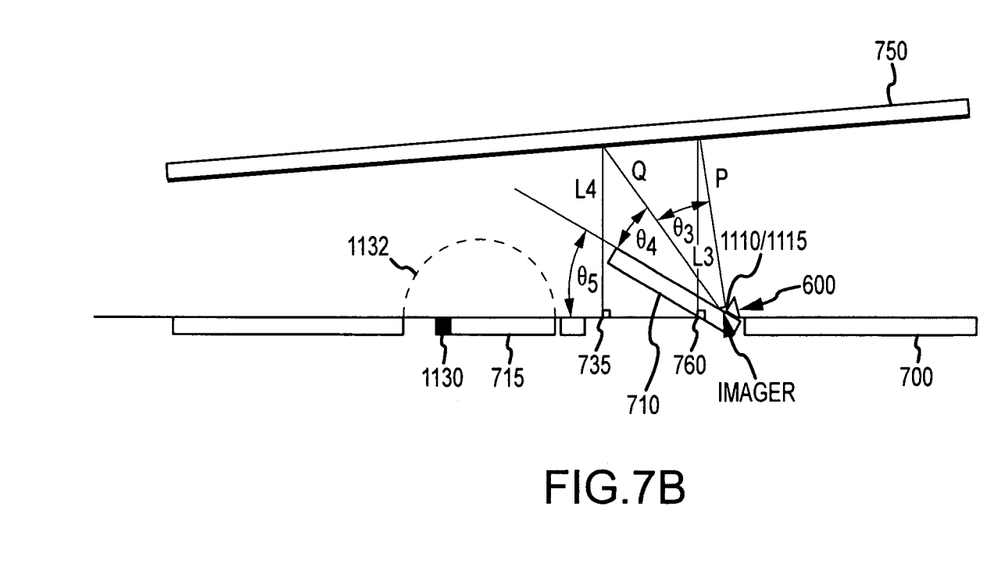

FIGS. 7A and 7B are schematic diagrams of a top view of a motor vehicle 700 comprising system 100 (see FIG. 1), OSRVM 600, a front-side door 710, and a rear-side door 715. As illustrated in FIGS. 7A and 7B, camera 1110 or ultrasonic sensor 1115 of system 100 is coupled to OSRVM 600 and points in a predetermined direction that enables the field of view of camera 1110 or sensor range of ultrasonic sensor 1115 to detect one or more obstacles 750 that may be located adjacent to motor vehicle 700 when front-side door 710 is closed (FIG. 7A) or open (FIG. 7B).

With reference to FIG. 7A, when front-side door 710 is closed (or closing), processor 1120 is configured to receive data indicating the position of front-side door 710 (i.e., that front-side door 710 is closed) from, for example, a door angle sensor (not shown) or other external position-sensing device. Camera 1110/ultrasonic sensor 1115 is configured to detect obstacles in the area adjacent to front-side door 710, the area represented by the angle $\theta_1$. The area represented by $\theta_1$ is in the range of about 60 degrees to about 100 degrees, where $\theta_1$ may be a pre-determined value based on the type and/or dimensions of camera 1110/ultrasonic sensor 1115.

With continued reference to FIG. 7A, to determine the distance obstacle 750 is away from motor vehicle 700, camera 1110/ultrasonic sensor 1115 calculates one or more distances (e.g., X and/or Y) from camera 1110/ultrasonic sensor 1115 to obstacle 750, and can then use any one of numerous geometric and/or trigonometric algorithms to determine the distance (e.g., L1 and/or L2) from one or more points (e.g., point 730 and 740) on motor vehicle 700 to obstacle 750.

For example, to determine the distance from point 730 to obstacle 750, camera 1110/ultrasonic sensor 1115 is configured to use the following formula: $L1=X(\sin(\theta_1+\theta_2))$. In determining the distance from point 740 to obstacle 750, camera 1110/ultrasonic sensor 1115 is configured to use the following formula: $L2=Y(\sin(\theta_2))$. Moreover, by comparing the calculated distances (i.e., L1 and L2), camera 1110/ultrasonic sensor 1115 is capable of determining the orientation of obstacle 750 with respect to motor vehicle 700. That is, if L1 is greater than L2 (i.e., L1>L2), then obstacle 750 is slanted toward the rear portion of motor vehicle 700, whereas if L1 is less than L2 (i.e., L1<L2), then obstacle 750 is slanted toward the front portion of motor vehicle 700.

In embodiments where camera 1110/ultrasonic sensor 1115 includes a field-of-view represented by the angle $\theta_{1'}$, camera 1110/ultrasonic sensor 1115 is configured to arbitrarily pick a sub-angle (e.g., $\theta_1$) within the angle $\theta_{1'}$ for measuring the distance Y. In one embodiment, the sub-angle is an angle that is approximately one-half of angle $\theta_{1'}$. For example, if the angle $\theta_{1'}$ is 100 degrees, the sub-angle would be 50 degrees. In other embodiments, the ratio selected for the sub-angle may be greater than or less than one-half The distance Y can then be calculated and used similar to the discussion above.

In other embodiments, camera 1110/ultrasonic sensor 1115 is configured to detect (e.g., scan) the length obstacle 750 to find an end point of obstacle 750, the end point including a distance Y just prior to the distance Y becoming infinity long. In one embodiment, camera 1110/ultrasonic sensor 1115 is configured to calculate the distance Y to the end point and create a profile of obstacle 750 by connecting the end point to the point of obstacle 750 from which distance X is determined. In another embodiment, camera 1110/ultrasonic sensor 1115 is configured to calculate one or more distances Y to various points on obstacle 750 in addition to the end point to generate a more detailed distance profile of obstacle 750. In this embodiment, camera 1110/ultrasonic sensor 1115 is configured to connect the various points on obstacle 750 to generate the distance profile of obstacle 750.

If obstacle 750 or any portion of obstacle 750 is detected within the threshold distance or within the opening/closing path of front-side door 710 and/or rear-side door 715, camera 1110/ultrasonic sensor 1115 is configured to transmit a signal to processor 1120 (see FIGS. 2-5) indicating such so that processor 1120 can notify motor controller 120 (see FIG. 1) to disable front-side door 710 and/or rear-side door 715 depending on where obstacle 750 is detected to be within the threshold distance or opening/closing path.

When front-side door 710 is open or opening (see FIG. 7B), processor 1120 is configured to receive data from the door angle sensor indicating the position of front-side door 710. Camera 1110/ultrasonic sensor 1115 is configured to determine one or more distances (e.g., L3 and L4) from obstacle 750 to one or more points (e.g., points 735 and 760) on motor vehicle 700. To determine the distance obstacle 750 is away from motor vehicle 700, camera 1110/ultrasonic sensor 1115 calculates one or more distances (e.g., P and/or Q) from camera 1110/ultrasonic sensor 1115 to obstacle 750, and can then use any one of numerous geometric and/or trigonometric algorithms to determine the distance (e.g., L3 and/or L4) from one or more points (e.g., point 735 and/or 760) on motor vehicle 700 to obstacle 750.

For example, to determine the distance from point 760 to obstacle 750, camera 1110/ultrasonic sensor 1115 is configured to use the following formula: $L3=P(\sin(\theta_3+\theta_4+\theta_5))$. In determining the distance from point 735 to obstacle 750, camera 1110/ultrasonic sensor 1115 is configured to use the following formula: $L4=Q(\sin(\theta_4+\theta_5))$. Moreover, by comparing the calculated distances (i.e., L3 and L4), camera 1110/ultrasonic sensor 1115 is capable of determining the orientation of obstacle 750 with respect to motor vehicle 700 similar to the discussion above with respect to FIG. 7A.

If obstacle 750 is detected within the threshold distance or within the opening/closing path of front-side door 710, camera 1110/ultrasonic sensor 1115 is configured to transmit a signal to processor 1120 (see FIGS. 2-5) indicating such so that processor 1120 can notify motor controller 120 (see FIG. 1) to disable front-side door.

In addition, when front-side door 710 is open and obstructs the field of view of camera 1110 or the scan range of ultrasonic sensor 1115, sensor 1130 is capable of determining if obstacle 750 or another obstacle is present within the threshold distance of and/or within the opening/closing path of rear-side door 715. That is, sensor 1130 is capable of determining if an obstacle is within a sensory range 1132 of rear-side door 715, and if so, transmit a signal to processor 1120 indicating such so that processor 1120 can notify motor controller 120 (see FIG. 1) to disable rear-side door 715.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for a motor vehicle including a motor vehicle side door and an outside rear view mirror, the system comprising:
    a door motor coupled to the motor vehicle side door and configured to selectively prevent movement of the motor vehicle side door toward a fully open position;
    a camera coupled to the outside rear view mirror and positioned to monitor an area external to the vehicle and adjacent the motor vehicle side door, the camera configured to determine a first distance between the motor vehicle side door and an obstacle detected within the monitored area;
    a motor controller operatively coupled to the door motor and configured to selectively disable the motor vehicle side door by commanding the door motor to prevent movement of the motor vehicle side door toward the fully open position; and
    a processor operatively coupled to the camera and to the motor controller, the processor configured to transmit a signal to the motor controller to disable the motor vehicle side door if the first distance is within a first threshold distance of the motor vehicle side door.

2. The system of claim 1, wherein the camera is a 3D time-of-flight (TOF) imager.

3. The system of claim 1, wherein the camera is coupled to a bottom portion of the outside rear view mirror.

4. The system of claim 1, wherein the camera is coupled behind a glass portion of the outside rear view mirror.

5. The system of claim 1, wherein the processor is further configured to transmit a signal to the motor controller to disable the motor vehicle side door if the obstacle is detected within an opening/closing path of the motor vehicle side door.

6. The system of claim 1, wherein the motor vehicle side door is a front-side door and the motor vehicle further includes a rear-side door adjacent to the front-side door, wherein:
    the camera is further configured to determine a second distance between the rear-side door and the obstacle; and
    the processor is configured to transmit a signal to the motor controller to disable the rear-side door if the second distance is within a second threshold distance of the rear-side door.

7. The system of claim 1, wherein the motor vehicle side door is a front-side door and the motor vehicle further includes a rear-side door adjacent to the front-side door, the system further comprising:
    a near-field sensor mounted to the motor vehicle adjacent the rear-side door, the near-field sensor operatively coupled to the processor and
    configured to detect conductive obstacles within the opening path of the rear-side door;
    wherein the processor is further configured to transmit a signal to the motor controller to disable the rear-side door if a conductive obstacle is detected within the opening path of the rear-side door.

8. The system of claim 7, wherein the near-field sensor is configured to operate when the front-side door is open.

9. The system of claim 1, wherein the motor vehicle side door is a front-side door and the motor vehicle further includes a rear-side door adjacent to the front-side door, the system further comprising:
    an ultrasonic sensor mounted to the motor vehicle adjacent the rear-side door, the ultrasonic sensor operatively coupled to the processor and
    configured to detect obstacles within the opening path of the rear-side door;
    wherein the processor is further configured to transmit a signal to the motor controller to disable the rear-side door if an obstacle is detected within the opening path of the rear-side door.

10. The system of claim 9, wherein the ultrasonic sensor is configured to operate when the front-side door is open.

11. A system for a motor vehicle including a motor vehicle side door and an outside rear view mirror, the system comprising:
    a door motor coupled to the motor vehicle side door and configured to selectively prevent movement of the motor vehicle side door toward a fully open position;
    a first ultrasonic sensor coupled to the outside rear view mirror and positioned to monitor an area external to the vehicle and adjacent the motor vehicle side door, the first ultrasonic sensor configured to determine a first distance between the motor vehicle side door and an obstacle detected within the monitored area;
    a motor controller operatively coupled to the door motor and configured to disable the motor vehicle side door by commanding the door motor to prevent movement of the motor vehicle side door toward the fully open position; and
    a processor operatively coupled to the ultrasonic sensor and to the motor controller, the processor configured to transmit a signal to the motor controller to disable the motor vehicle side door if the first distance is within a first threshold distance of the motor vehicle side door.

12. The system of claim 11, wherein the first ultrasonic sensor is coupled to a bottom portion of the outside rear view mirror.

13. The system of claim 11, wherein the processor is further configured to transmit a signal to the motor controller to disable the motor vehicle side door if the obstacle is within an opening/closing path of the motor vehicle side door.

14. The system of claim 11, wherein the motor vehicle side door is a front-side door and the motor vehicle further includes a rear-side door adjacent to the front-side door, the system further comprising:
    a near-field sensor mounted to the motor vehicle adjacent the rear-side door, the near-field sensor operatively coupled to the processor and
    configured to detect conductive obstacles with the opening path of the rear-side door, and the processor is further configured to transmit a signal to the motor controller to disable the rear-side door if a conductive obstacle is detected within the opening path of the rear-side door.

15. The system of claim 14, wherein the near-field sensor is configured to operate when a front-side door is open.

16. The system of claim 11, wherein the motor vehicle side door is a front-side door and the motor vehicle further includes a rear-side door adjacent to the front-side door, the system further comprising:
a second ultrasonic sensor coupled to the rear-side door and in communication with the processor, wherein:
the second ultrasonic sensor is configured to detect the obstacle within a second threshold distance of the rear-side door when the front-side door is open, and the processor is further configured to transmit a signal to the motor controller to disable the rear-side door if the obstacle is detected.

17. A method carried-out by a vehicular system onboard a vehicle including a plurality of motor vehicle side doors and a door motor coupled to the plurality of motor vehicle side doors and configured to selectively prevent movement of each of motor vehicle side doors toward a fully open position, the vehicular system including a motor controller operatively coupled to the door motor, a processor operatively coupled to the motor controller, and at least one obstacle detection device operatively coupled to the processor, the method comprising the steps of:
monitoring via the obstacle detection device an area external to the vehicle and adjacent the plurality of vehicle side doors to detect obstacles in the opening paths of the vehicle side doors;
determining in the obstacle detection device the distance between at least one of the plurality of motor vehicle side doors and an obstacle detected within the monitored area; and
supplying a signal generated by the processor to the motor controller to command the door motor to automatically disable each motor vehicle side door that is within a threshold distance of the obstacle.

18. The method of claim 17, wherein the at least one obstacle detection device comprises a camera, and wherein the step of determining comprises determining in the camera the distance between the plurality of motor vehicle side doors and the obstacle based at least partially upon 3-dimensional imaging data.

19. The method of claim 18, wherein the at least one obstacle detection device further comprises a capacitive sensor, and wherein the step of determining comprises utilizing the capacitive sensor to detect if the obstacle is within the threshold distance of a rear-side door when a front-side door is open.

20. The method of claim 17, wherein the at least one obstacle detection device comprises a sensor selected of the group consisting of a sound wave sensor and a radio wave sensor, and wherein the step of determining comprises utilizing the sensor to determine if the obstacle is within the threshold distance.

* * * * *